W. RANDOLPH.
NUT.
APPLICATION FILED MAR. 10, 1913.
1,102,686.　　　　　　　　　　　Patented July 7, 1914.
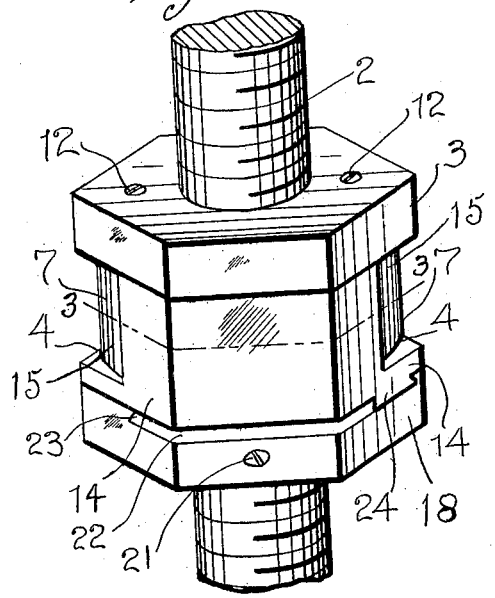
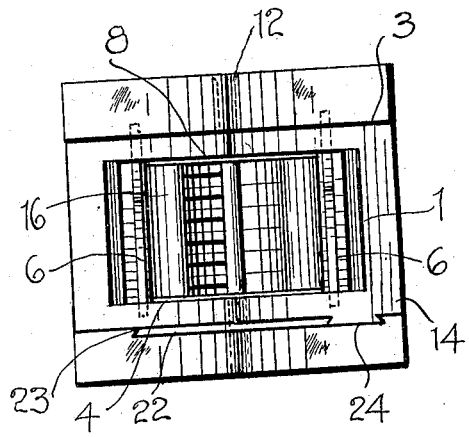
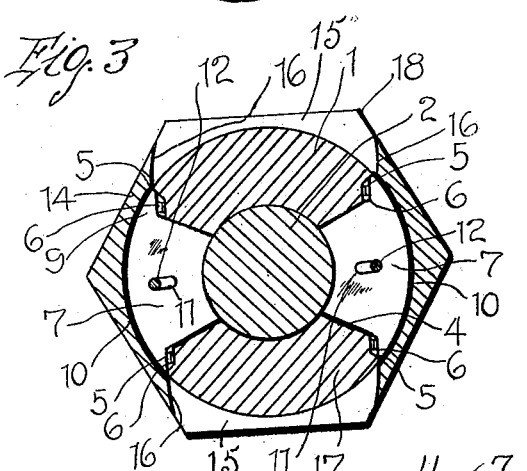
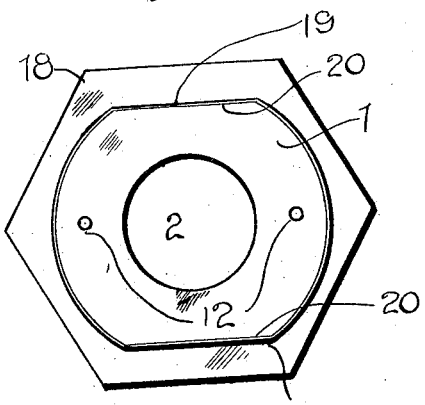
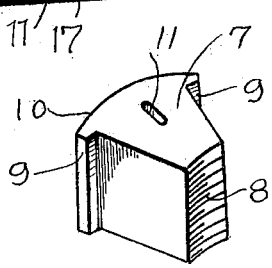
Inventor
WILLIAM RANDOLPH.
Witnesses
Robert M. Sutphen.
A. J. Hind.
By Watson E. Coleman
Attorney

UNITED STATES PATENT OFFICE.

WILLIAM RANDOLPH, OF CROWS LANDING, CALIFORNIA.

NUT.

1,102,686.  Specification of Letters Patent.  Patented July 7, 1914.

Application filed March 10, 1913. Serial No. 753,416.

*To all whom it may concern:*

Be it known that I, WILLIAM RANDOLPH, a citizen of the United States, residing at Crows Landing, in the county of Stanislaus and State of California, have invented certain new and useful Improvements in Nuts, of which the following is a specification, reference being had to the accompanying drawings.

This invention comprehends certain new and useful improvements in nuts and has for its primary object to provide a nut including removable thread gripping members, whereby the nut may be readily adapted for engagement upon bolts of various diameters and caused to grip the threads thereof, by employing the proper size thread gripping members.

Another object is to provide a nut of this character which may be readily applied or removed, as required and which will be constructed in such manner as to make it impossible for same to work off of the bolt to which it has been applied.

Another object is to provide a nut of this character which will be composed of the minimum number of parts and which will be highly efficient and effective in use.

Another object is to generally improve and simplify the construction of devices of this character and construct the same in such manner that they may be readily and cheaply manufactured and will be durable, thereby greatly increasing the commercial value of the same.

With the above and other objects in view, this invention consists in the novel features of construction, combination and arrangement of parts to be hereinafter more fully described, claimed and illustrated in the accompanying drawings, in which—

Figure 1, is a perspective view of my improved nut in position upon a bolt, the ends of the bolt being broken away. Fig. 2, is an elevational view of my improved nut removed and one of the segmental thread gripping members removed from the body of said nut. Fig. 3, is a horizontal cross sectional view through the nut in position upon the bolt, as seen on the line 3—3 of Fig. 1. Fig. 4, is a bottom plan view of the nut removed. Fig. 5, is a detail perspective view of one of the segmental thread gripping members removed. Fig. 6, is a detail view of one of the guide and movement limiting pins for the segmental thread gripping members.

Referring more specifically to the drawings in which similar reference characters designate corresponding parts throughout the several views, 1 designates the body portion of the nut which has a longitudinal bore 2 and is provided with a flange 3 at its inner end, the purpose of which will presently appear.

The body portion 1 is provided in opposite sides with the openings 4 extending inwardly to the bore 2, said openings 4 tapering at their opposite sides toward the bore 2. The body portion 1 is further provided with longitudinal recesses 5 located at the upper vertical edge of each side wall of the opening 4, to receive the curved leaf springs 6, the purpose of which will also presently appear.

The body portion of the nut is of substantially cylindrical form in cross section and the segmental thread gripping members 7 have their upper and lower as well as their side faces formed to correspond to the walls of the openings 4. The inner or smaller ends of the segmental members 7 are curved inwardly from the opposite sides of the device and threaded, as shown at 8 for engagement with the threads of a bolt extending through the central bore 2 of the body 1. Each segmental thread gripping member 7 is provided at its outer end with the oppositely directed shoulders 9 extending outwardly from the opposite side edges of said member and adapted for engagement outwardly of the recesses and against the curved leaf springs 6, it being understood that the under or inner faces of the shoulders 9 are flat while their outer faces are curved and form continuations of the curved outer end 10 of said member 7. It will be understood that the upper and lower ends of the openings 4 are spaced from the upper and lower ends of the body portion 1 of the nut and the height of the member 7 corresponds to the length of the thread openings.

Each segmental thread gripping member 7 is provided near its outer end with the vertical elongated slot 11 through which is passed a locking pin 12 which also extends longitudinally through the body 1 of the nut and has its lower end threaded, as shown at 13 for engagement with the lower threaded end of the opening provided for said pin in the body 1 of the nut, to secure the pin in position, it being understood that the pin, when in position, limits the inward and outward movement of the segmental thread gripping member 7 through which it extends.

It will be seen that the springs 6 tend to resiliently retain the members 7 in their outermost positions and said members 7 are forced inwardly and retained in this position by means of the rotatable sleeve 14 engaged around the body 1 of the nut and around the outer curved faces 10 of the members 7. The sleeve 14 is provided in its main portion with two diametrically opposite openings 15, the side walls of which are beveled inwardly, as shown at 16 and when the sleeve is positioned so that the openings 15 are opposite the thread gripping members 7, the latter are forced outwardly and from engagement with the threads of the bolt, by means of the springs 6. The thread gripping members 7 may be readily forced inwardly, however, by rotating the sleeve 14 and causing the beveled walls 16 of the openings 15 to ride over the shoulders 9 and it will be seen that by simply giving the sleeve a quarter turn in one direction, the openings 15 will be between the segmental thread gripping members 7 and the solid portions 17 of the sleeve 14 will be engaged over the outer curved ends of said segmental members 7, thereby retaining said members in engagement with the threads of the bolt and preventing rotation of the nut. It will be understood that while the inner face of the sleeve is rounded to correspond with the outer face of the body 1 of the nut, the outer face of the sleeve 14 is formed to correspond with the inner flange 3. As the pins 12 limit outward movement of the segmental thread gripping members 7, it will be seen that said members will be prevented from flying out of the body 1. The sleeve 14 is turned to bring the openings 15 opposite the members 7.

The sleeve 14 is held in position upon the body 1 of the nut by means of the inner flange 3 and the upper flange 18 which is positioned upon the outer end of the body 1 of the nut, it being understood that said outer end is provided with opposite flat portions 19 and the flange 18 has its central openings formed with opposite straight portions 20 for engagement with the flat portions 19, thereby preventing rotation of the upper flange 18 upon the body of the nut. The flange 18 is securely held in position upon the outer end of the body of the nut by the screws 21 or other suitable means engaged transversely through the flange at opposite points, and extending into the body of the nut. The lower flange 18 is provided in its upper edge with opposite guide channels 22 having their opposite end walls beveled inwardly and downwardly, as shown at 23 and the sleeve 14 is provided with the dove-tail guide lugs 24 depending from its lower edge and engaged in the guide channels 22, thus guiding the sleeve 14 and limiting rotation of the same in either direction.

It will be understood that I have shown the nut as being engaged upon the largest size bolt from which this size nut can be positioned and when this nut is to be engaged upon a similar size bolt, the flange 18 and sleeve 14 are removed and the pins 12 withdrawn, in order that the segmental thread gripping members 7 may be removed and segmental thread gripping members of a different size and having proper pitch threads upon their ends, substituted for the segmental thread gripping members shown in the drawing.

It will thus be seen that I have provided a nut which will securely grip the threads of a bolt upon which the nut is positioned and it will be evident that the nut may be readily moved upon the bolt or removed therefrom, by rotating the sleeve 14 to bring the openings 15 thereof opposite the thread gripping members 7 and thereby allow the same to move outwardly and from engagement with the threads of the bolt. It will further be seen that it is unnecessary to remove the lower flange 18 for the purpose of placing the nut upon a bolt or removing the nut from said bolt. It will further be evident that as the segmental thread gripping members 7 are allowed a limited movement in either direction, they will automatically adjust themselves to the threads of the bolt with which the latter is engaged and will securely grip said threads and thereby prevent rotation of the nut while the threaded inner ends of said thread gripping members are in engagement with the threads of the bolt. It will further be seen that owing to the extremely simple construction of the parts of this device, the same may be readily and cheaply manufactured and should any of the parts become worn or broken, they may be readily replaced at a small cost.

While I have shown the preferred embodiment of my invention, I wish to be understood that minor changes may be made within the scope of the appended claims without departing from the spirit of my invention.

Having thus described my invention, what I claim is:—

1. A nut comprising a body portion having a longitudinal bolt receiving bore and transverse openings communicating with said bore, said nut having a rigid flange at one end and a removable flange at its opposite end, thread engaging members positioned in said openings, a member engaged around the body portion between the flanges and having openings separated by solid portions, said member being adapted when in operative position to retain the thread engaging members in engagement with the bolt positioned in the bore of the nut, and means for resiliently forcing the thread engaging members outwardly when the member between the flanges is in inoperative position.

2. A nut comprising a body portion having a longitudinal bolt receiving bore and transverse openings communicating with said bore, said nut having a rigid flange at one end and a removable flange at its opposite end, thread engaging members positioned in said openings, a sleeve engaged around the body portion between the flanges and adapted to be rotated for a limited distance in either direction, said sleeve having transverse openings with solid portions between said openings, means for resiliently forcing the thread engaging members outwardly when the sleeve is in one position with its openings opposite the transverse openings in the body portion of the nut, and means for limiting outward movement of the thread engaging members.

3. A nut comprising a body portion having a longitudinal bolt receiving bore and transverse openings communicating with said bore, said nut having a rigid flange at one end and a removable flange at its opposite end, thread engaging members positioned in said openings, a sleeve rotatably engaged around the body portion between the flanges and having transverse openings with solid portions between said openings, said sleeve being adapted to retain the thread engaging members in their innermost positions and in engagement with a bolt positioned in the bore when the solid portions of said sleeve are opposite said members, means for resiliently forcing the members outwardly when the openings in the sleeve are opposite said members, means for limiting movement of the sleeve in either direction around the body portion, and means for limiting inward and outward movements of the thread engaging members.

In testimony whereof I hereunto affix my signature in the presence of two witnesses.

WILLIAM RANDOLPH.

Witnesses:
L. McAulay,
Henry S. Ellis.

---

Copies of this patent may be obtained for five cents each, by addressing the "Commissioner of Patents, Washington, D. C."